June 26, 1951 L. O. GREEN 2,558,083
CONTROLLER HANDLE FOR ELECTRODE HOLDERS
Filed Nov. 26, 1949 2 Sheets-Sheet 2

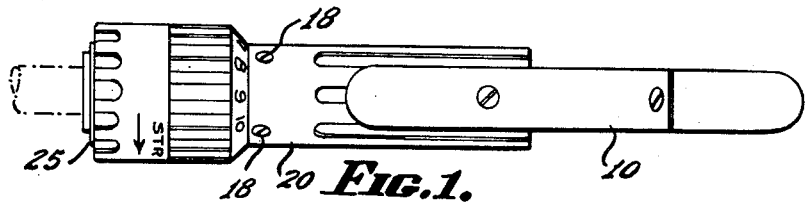
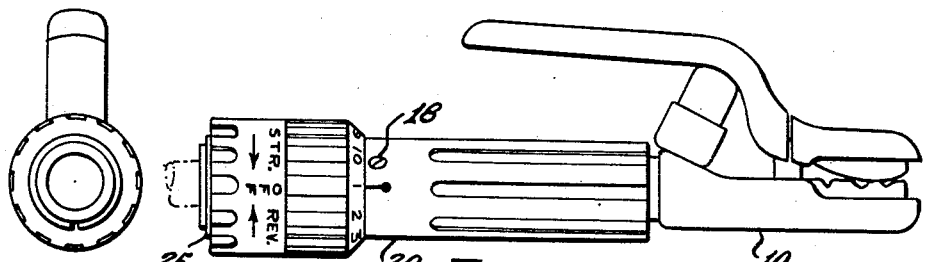
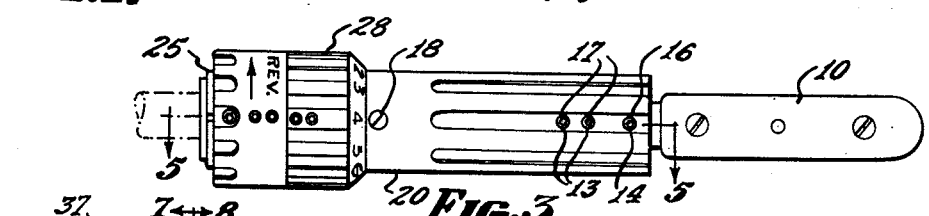
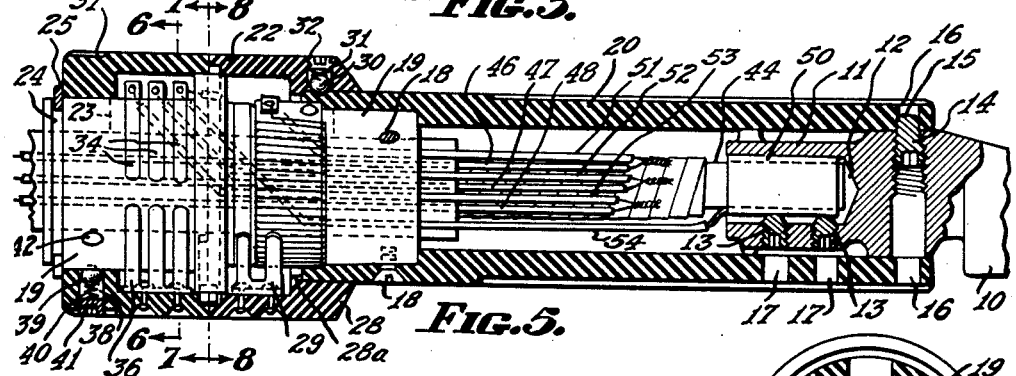
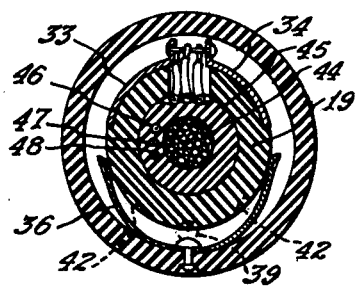
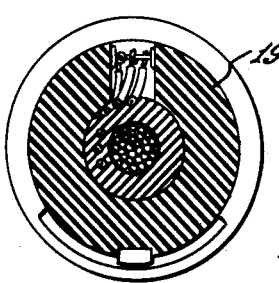

INVENTOR.
LAWRENCE O. GREEN,
BY
ATTORNEYS.

Patented June 26, 1951

2,558,083

UNITED STATES PATENT OFFICE 2,558,083

CONTROLLER HANDLE FOR ELECTRODE HOLDERS

Lawrence O. Green, Cincinnati, Ohio, assignor to The Foster Transformer Company, Cincinnati, Ohio, a corporation of Ohio Application November 26, 1949, Serial No. 129,637

4 Claims. (Cl. 201—48)

This invention relates to a controller handle for electrode holders. More specifically it relates to a handle for electrode holders for electric welding operations which handle has built into it one or more control elements.

In most electric welding set-ups, even where a portable welding machine is used, the welding generator is driven by a prime mover of one type or another and a cable runs from the welding generator to an electrode holder which is handled by the operator. Usually the operator operates at some distance from the welding generator. The controls for the welding generator are usually mounted on a panel associated with the machine so that when the welder desires to turn on the current or shut it off or vary its intensity he must leave his work and go back to the machine to make his adjustment. In the alternative a second operator is required who is stationed at the machine and makes the adjustment in response to oral directions by the welder.

There have been developed in recent years control circuits for electric welding operations whereby the actual welding current is turned on and off by means of a relay, the relay itself being energized by extremely low voltage through electronic means. Similarly, in welding operations it is often desirable to reverse the polarity of the welding current (welding current is always direct current and the polarity is of great importance). In recent years circuits have been developed whereby a conventional reversing switch for the polarity of the welding current is actuated by a relay which in turn is energized by very low voltage. Similarly the intensity of the welding current can now be adjusted by a rheostat operating on low voltages through the electronic circuit mentioned generally above. The particular circuits do not form a part of the present invention and will not be described further herein.

With the foregoing considerations in mind, it is an object of the present invention to provide a handle member for an electrode holder which handle member has built into it a switch for turning on the welding current (through a suitable electronic circuit) with the polarity in one direction or the other as desired.

It is another object of the invention to provide a handle member as outlined above which has built into it a rheostat control member for adjusting the intensity of the welding current.

It is yet another object of the invention in order to provide for safety as well as neatness in appearance to provide control members as above outlined which are annular in the form of sleeves which are actuated by rotating them about the body of the handle member.

Further objects of the invention include means whereby the welding cable may be clamped in the electrode holder without removing the electrode holder from the handle member as well as the provision of means whereby the electrode holder may be secured in the handle member so that even upon loosening of a set screw relative twisting between the electrode holder and the handle member cannot take place.

These and numerous other objects of the invention which will be pointed out in more detail hereinafter or which will become apparent as this description proceeds are accomplished by that certain construction and arrangement of parts of which I shall now describe an exemplary embodiment.

Reference is made to the drawings forming a part hereof and in which:

Figure 1 is a plan view of an electrode holder and handle member according to the present invention.

Figure 2 is a side elevational view of the same.

Figure 3 is a bottom plan view of the same.

Figure 4 is an end elevation of the same as seen from the left hand end of Figure 2.

Figure 5 is a longitudinal central cross sectional view of the handle member on an enlarged scale.

Figure 6 is a transverse cross sectional view taken on the line 6—6 of Figure 5.

Figure 7 is a transverse cross sectional view taken on the line 7—7 of Figure 5.

Figure 8 is a transverse cross sectional view taken on the line 8—8 of Figure 5.

Figure 10:
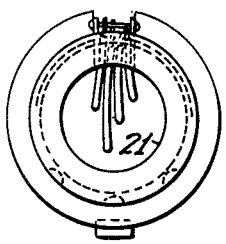
Figure 10 is an end elevational view of the same as seen from the left of Figure 9.

Briefly, in the practice of the invention I provide a handle member of generally tubular shape and made of suitable non-conductive material. At one end this handle member has a socket for receiving an electrode holder and means are provided for securing the electrode holder in position. Secured within the handle member is a plug member carrying contact elements for the polarity reversing switch and carrying also a rheostat element, and the handle member is provided with two rotatable sleeves adjacent the opposite end from the electrode holder, one of which sleeves carries a slider element for the rheostat and the other of which sleeves carries contactors to contact the respective contact elements for the polarity reversing switch.

Referring now in more detail to the figures, a conventional electrode holder is indicated at 10. Since the structure of this electrode holder forms no part of the present invention it will not be described in detail. It may be stated in passing that the end of the electrode holder which is secured to the handle member of the invention comprises a plug member indicated generally at 11, having a socket 12 within which the end of the welding cable may be received and clamped, as by means of the set screws 13. The set screws 13, as is conventional, are provided with polygonal recesses therein for use with a conventional Allen wrench.

Generally speaking, such electrode holders have been provided with set screws such as indicated at 14 for securing the electrode holder within the handle member, but according to the present invention the structure is modified to the extent that the set screw 14 is provided with an extending nose 15, and the handle member indicated generally at 20 is provided with diammetrically opposite holes 16 into one of which the nose 15 of the set screw 14 may extend. The other of the holes 16 thus serves as an access opening for the Allen wrench whereby the screw 14 may be adjusted. The handle member 20 is also provided with suitable holes 17 to provide access openings for the set screws 13. Thus, one of the advantages of the invention will now be apparent. If the screw 14 becomes loosened in use the nose 15 thereof still extends into the bore 16 and relative twisting motion between the electrode holder and the handle member is prevented. The other advantage which is immediately apparent is that the clamping engagement of the set screw 13 with the end of the welding cable can be adjusted by passing the Allen wrench through the hole 17 without the necessity of removing the handle from the electrode holder.

Secured in the handle member 20 as by means of the screws 18, is a plug member indicated generally at 19 which is shown in greater detail in Figures 9 to 12 inclusive.

The plug member 19 is provided with an axial bore for the passage of welding cable which bore is indicated at 21. More or less centrally of the plug member 19 is an annular shoulder 22 which serves as one of the bearing surfaces for the two rotatable sleeves which will be described hereinafter. Generally parallel to its axis the plug 19 is provided with an elongated aperture 23 for the passage of various wires of the control circuit. At one end the plug is provided with an annular groove 24 to receive the split ring 25 which serves to hold the entire assembly together as will be clearly brought out hereinafter.

Figure 9:
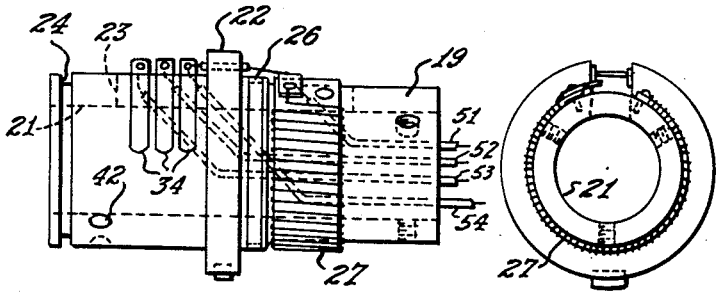
Figure 9 is a detailed elevational view of the plug member removed from the handle member.
Figure 11:
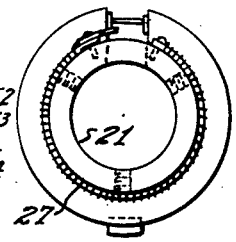
Figure 11 is an end elevational view as seen from the right of Figure 9.
Figure 12:
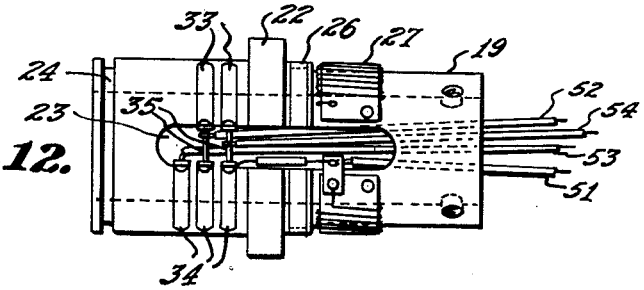
Figure 12 is a top plan view of the plug member of Figure 9.
Figure 13:
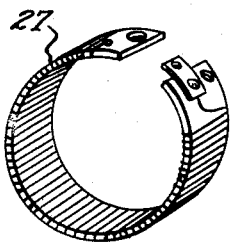
Figure 13 is a perspective view of the rheostat elements.
Figure 15:
Figure 15 is a perspective view of the rheostat slider member secured to the other of the rotatable sleeves.

In Figures 9 and 12 the left hand side of the plug member may be considered the polarity reversing switch side, while the right side may be considered as the rheostat side. On the rheostat side I provide an annular commutator member 26 of suitable conductive material and an annular rheostat member 27 (shown in detail in Figure 13). One of the two rotatable sleeves indicated at 28 in the figures carries a two-pronged slider member 29 shown in detail in Figure 15. One prong of the member 29 rides on the commutator 26 while the other rides upon the rheostat 27 so that upon rotation of the sleeve 28 the voltage can be changed from a maximum to a minimum. The sleeve 28, as will be clear from a consideration of Figure 5, has a bearing at its right hand end on the member 20 while at its left hand end it has a bearing on the shoulder 22. In order to provide a frictional resistance to turning of the sleeve 28 to avoid accidental displacement of a given setting I may provide friction means such as a small ball or the like 30 urged by a spring member 31 held in place by a screw 32, and the ball member 30 bears against the outer periphery of the member 28. If desired, the member 28 may be provided with a series of depressions so that the ball 30, engaging in one of said depressions, will tend to hold the sleeve 28 against accidental displacement. I have found however that simple frictional engagement will usually be sufficient.

Coming now to the left hand side of Figures 9 and 12 which we may consider as being the polarity reversing switch side, there are provided on the plug member 19 two sets of contact elements. On one side we have the contact elements 33, and on the other side the contact elements 34. In the particular embodiment shown for the particular control circuit used the two contact elements 33 are bridged across at 35 to the corresponding contact elements 34 so that no matter which direction the switch is moved a contact is made. The extra contact element 34 leads to a circuit through a relay to operate the polarity reversing switch. Thus when the elements 34 are connected together the reversing switch functions whereas when the contact elements 33 are connected together a normal polarity is obtained.

Figure 14:
Figure 14 is a perspective view of the contactors secured to one of the rotatable sleeves.

The polarity reversing operation is accomplished by means of a contactor 36 shown in detail in Figure 14. The contactor 36 is secured within the rotatable sleeve 37, and it will be clear that when the sleeve is rotated in one direction the prongs of the contactor 36 will connect together the contact elements 34 and when the sleeve 37 is rotated in the opposite direction the other arms or prongs of the contactor 36 will connect together the contact elements 33. In a central position the contactor 36 does not make contact either with the contact elements 33 or 34.

As will be clear from an examination of Figure 5, the left hand end of the sleeve 37 has its bearing upon the periphery of the plug member 19 whereas at its other end the sleeve 37 has its bearing upon the shoulder 22. As before, I prefer to provide an aperture 38 in the sleeve 37 and within the aperture I provide a small ball 39 pressed by means of a spring 40 retained by the screw 41 against the plug 19. The plug itself may and preferably will be provided with three depressions 42 to define the three positions for the polarity reversing switch. The central position will be the neutral position with no contact completed while one position will be normal polarity and the opposite position will be reverse polarity.

It will be observed that the sleeve 28 has an inner annular shoulder 28a which serves to limit movement toward the right of the sleeve 28 with respect to the handle member 20. The sleeve 37 is flush against the sleeve 28, and the sleeve 37 at its opposite end bears against the split ring 25 held in the groove 24 of the plug member 19, and thus the entire assembly is held together.

Figure 16:
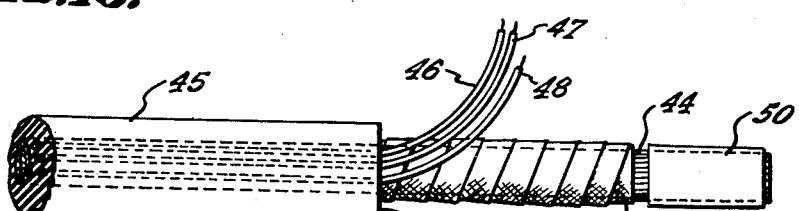
Figure 16 is a fragmentary view of the welding cable showing its construction.

The welding cable is shown in Figure 16 and for the purpose of assembly to the electrode holder and the handle member it will be stripped down to a point indicated at 43. In addition to the welding cable proper which is indicated at 44 the heavy rubber sheath 45 contains three leads 46, 47 and 48 which are leads for the control circuit. The extreme end of the cable is stripped down to the bare wire from a point indicated at 49 and is covered with a sheet of foil or the like 50. The portion 50 is the portion which is engaged in the socket 12 of the electrode holder and clamped in place as shown in Figure 5. The appropriate leads 46, 47 and 48 are connected to the leads 51, 52 and 53 from the polarity reversing switch and rheostat as shown. The fourth lead 54 which is the common return lead is connected in with the welding cable 44 within the foil wrapping 50 as shown.

Since the present invention does not involve the details of the welding control circuit, the circuit has not been described at all. One skilled in the art with the present teachings before him will be able to make the necessary and proper connections.

It will be clear that numerous modifications may be made without departing from the spirit of the present invention, and I therefore do not intend to limit myself in any way except as pointed out in the claims which follow.

Having now fully described my invention, what I claim as new and desire to secure by Letters Patent is:

1. A device for use with a welding electrode holder, said device having an axial welding cable passage, and having means at one end for receiving an electrode holder, a rotatable sleeve on said handle member adjacent the other end thereof, two sets of contact elements within said handle member and contactors secured to said rotatable sleeve, and means to provide three positions for said sleeve in one of which said contactors make contact with one of said sets of contact elements, in another of which said contactors make contact with neither of said sets of contact elements, and in a third of which said contactors make contact with the other of said sets of contact elements.

2. A device for use with a welding electrode holder, said device having an axial bore therein, a plug member in said bore, said plug member having an axial welding cable passage, means at one end of said handle member for receiving an electrode holder, a rotatable sleeve on said handle member adjacent the other end thereof, two sets of contact elements on said plug member and contactors secured to said rotatable sleeve, and means to provide three positions for said sleeve in one of which said contactors make contact with one of said sets of contact elements, in another of which said contactors make contact with neither of said sets of contact elements, and in a third of which said contactors make contact with the other of said sets of contact elements.

3. A device for use with a welding electrode holder, said device having an axial welding cable passage, and having means at one end for receiving an electrode holder, two rotatable sleeves on said handle member adjacent the other end thereof, an annular rheostat within said handle member in the area occupied by one of said rotatable sleeves, the slider for said annular rheostat being secured to said one of said rotatable sleeves, two sets of contact elements within said handle member in the area occupied by the other of said rotatable sleeves, contactors secured to said other of said rotatable sleeves, and means to provide three positions for said other rotatable sleeve in one of which said contactors make contact with one of said sets of contact elements, in another of which said contactors make contact with neither of said sets of contact elements, and in a third of which said contactors make contact with the other of said sets of contact elements.

4. A device for use with a welding electrode holder, said device having an axial bore therein, a plug member in said bore, said plug member having an axial welding cable passage, means at one end of said handle member for receiving an electrode holder, two rotatable sleeves on said handle member adjacent the other end thereof, an annular rheostat on said plug member and an annular commutator on said plug member in the area occupied by one of said rotatable sleeves, and a two pronged slider member secured to said one of said rotatable sleeves with one prong contacting said annular rheostat and the other prong contacting said commutator, two sets of contact elements on said plug member in the area occupied by the other of said rotatable sleeves, contactors secured to said other of said rotatable sleeves, and means to provide three positions for said other of said rotatable sleeves in one of which said contactors make contact with one of said sets of contact elements, in another of which said contactors make contact with neither of said sets of contact elements, and in a third of which said contactors make contact with the other of said sets of contact elements.

LAWRENCE O. GREEN.

REFERENCES CITED

The following references are of record in the file of this patent:

UNITED STATES PATENTS

| Number | Name | Date |
| --- | --- | --- |
| 1,345,817 | Williams | July 6, 1920 |
| 1,628,926 | Short | May 17, 1927 |
| 1,664,022 | Churchward | Mar. 27, 1928 |
| 1,754,353 | Endebak | Apr. 15, 1930 |
| 2,283,162 | Bourque | May 19, 1942 |
| 2,305,189 | Nowicke | Dec. 15, 1942 |
| 2,364,507 | Bernard | Dec. 5, 1944 |
| 2,379,837 | Stahmer | July 3, 1945 |
| 2,395,343 | Morse | Feb. 19, 1946 |
| 2,401,523 | Townsend | June 4, 1946 |
| 2,425,183 | Hall | Aug. 5, 1947 |
| 2,480,995 | Armitage | Sept. 6, 1949 |
| 2,484,959 | Redekopp | Oct. 18, 1949 |